United States Patent [19]

Thompson

[11] Patent Number: 5,046,231
[45] Date of Patent: * Sep. 10, 1991

[54] DEVICE FOR MOUNTING AND DISMOUNTING RIGID EXPANDABLE SLEEVES

[75] Inventor: William L. Thompson, Vancouver, Wash.

[73] Assignee: International Composites Corporation, Vancouver, Wash.

[*] Notice: The portion of the term of this patent subsequent to Dec. 25, 2007 has been disclaimed.

[21] Appl. No.: 474,554

[22] Filed: Feb. 1, 1990

Related U.S. Application Data

[62] Division of Ser. No. 293,131, Jan. 3, 1989, Pat. No. 4,979,278.

[51] Int. Cl.⁵ .............................................. B23P 19/00
[52] U.S. Cl. ..................................... 29/426.6; 29/450; 29/728; 29/235
[58] Field of Search ..................... 29/895.211, 895.23, 29/426.6, 450, 505, 728, 234, 235, 282, 283.5; 269/47, 48.1

[56] References Cited

U.S. PATENT DOCUMENTS

| | | | |
|---|---|---|---|
| 2,518,834 | 8/1950 | Streckfus et al. | 154/41 |
| 2,645,004 | 7/1953 | Dorner | 29/234 |
| 2,813,331 | 11/1957 | Hohl | 29/450 |
| 3,022,573 | 2/1962 | Bullock | 29/235 |
| 3,126,624 | 3/1964 | Mirsky et al. | 29/450 |
| 3,146,709 | 9/1964 | Bass et al. | 101/375 |
| 3,192,616 | 7/1965 | Austin | 29/234 |
| 3,611,536 | 10/1971 | Guenther et al. | 29/200 |
| 3,846,901 | 11/1974 | Lovett | 29/235 |
| 4,089,265 | 5/1978 | White et al. | 101/375 |
| 4,144,812 | 3/1979 | Julian | 101/382 |
| 4,144,813 | 3/1979 | Julian | 101/382 |
| 4,199,851 | 4/1980 | Doherty | 29/235 |
| 4,903,597 | 2/1990 | Hoage et al. | 101/375 |

FOREIGN PATENT DOCUMENTS 758830  7/1933  France ........................................ 3/5

Primary Examiner—P. W. Echols
Assistant Examiner—David P. Bryant
Attorney, Agent, or Firm—Marger, Johnson, McCollom & Stolowitz, Inc.

[57] ABSTRACT

The invention is directed to a device for axially and externally mounting an expandable sleeve onto, and dismounting the sleeve from, a cylinder. The subject device comprises an external fluid-transmission means for expanding the diameter of the expandable sleeve by introducing a fluid capable of expanding the sleeve between the inner surface of the sleeve and the outer surface of the cylinder. The requisite sleeve expansion is accomplished without transmitting fluid from within the cylinder during the mounting and dismounting operations. The sleeve is contractable by the removal of the fluid.

26 Claims, 2 Drawing Sheets

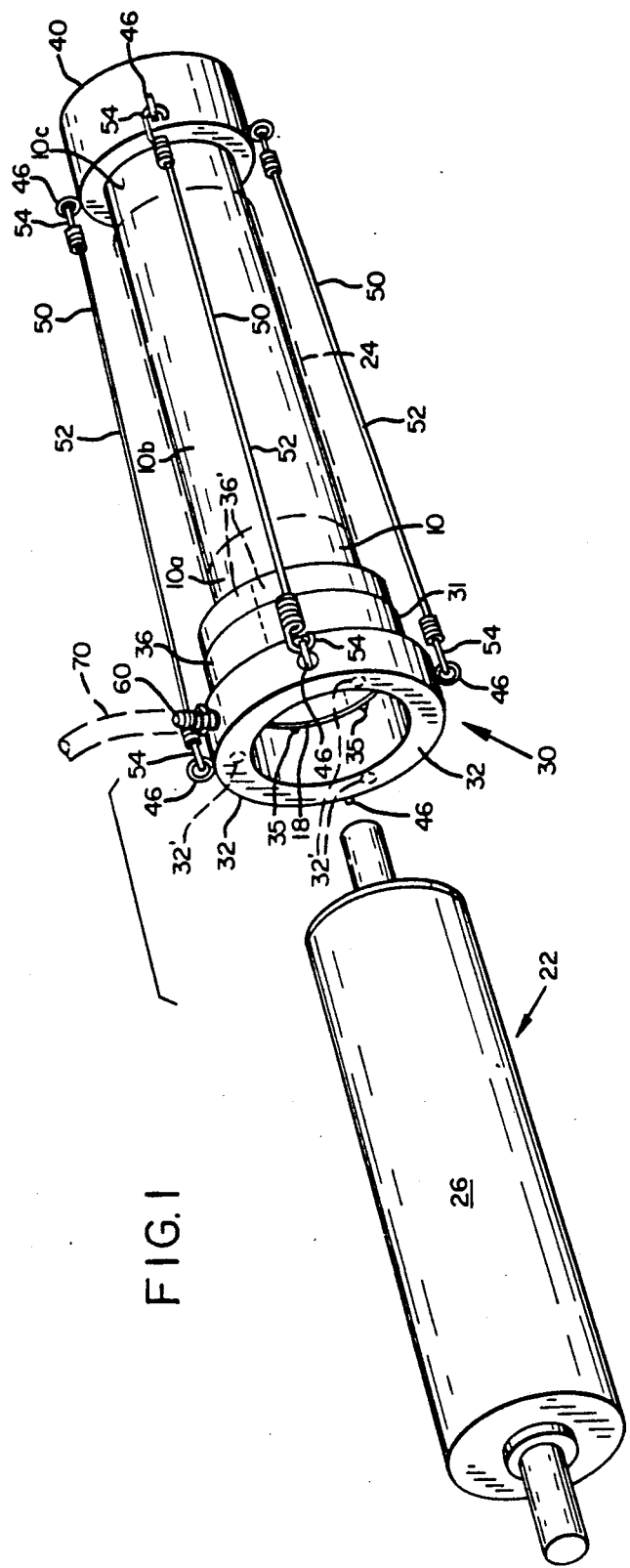
FIG.1
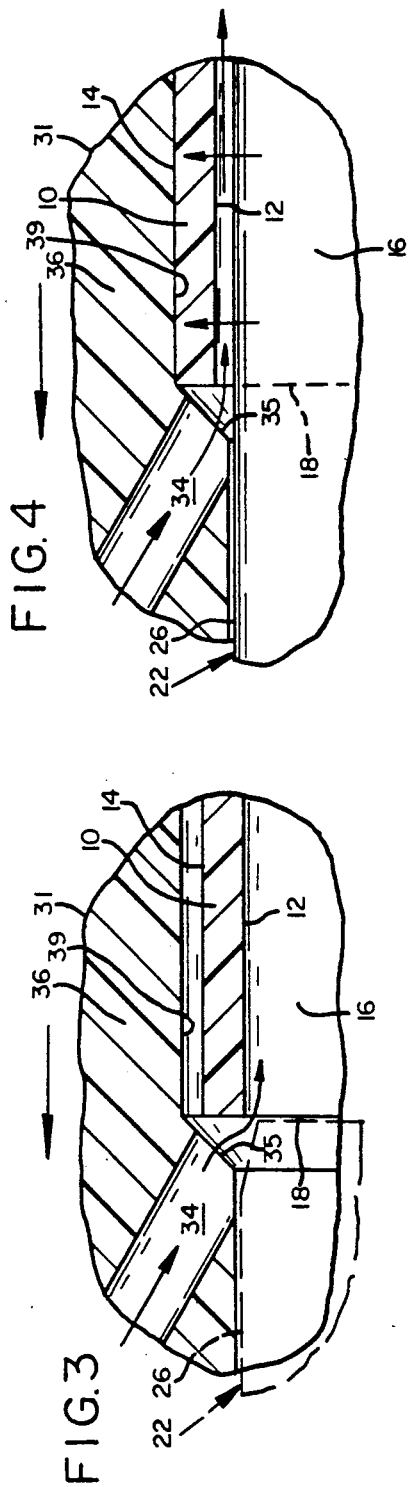
FIG.4
FIG.3

DEVICE FOR MOUNTING AND DISMOUNTING RIGID EXPANDABLE SLEEVES

This is a division of application Ser. No. 07/293,131, filed Jan. 3, 1989, now U.S. Pat. No. 4,979,278.

BACKGROUND

This invention relates to certain devices and methods for readily mounting expandable sleeves onto and dismounting expandable sleeves from printing cylinders, and more particularly to devices and methods for expandably mounting and dismounting expandable sleeves employing a pressurized fluid.

Expandable sleeves have been used in various prior art applications. For instance, in past printing operations, flexible printing plates were mounted onto the outer surface of a solid printing cylinder. These printing plates were used for printing of ink images onto a printing medium. Typically, the back of the plates were adhered directly to the printing cylinder. Since these plates were not readily interchangeable from one cylinder to another, the use of a multiplicity of printing cylinders to perform a multiplicity of jobs was required. This presented severe storage and cost problems to the end user.

Therefore, in an effort to overcome the above problems, printing sleeves were developed which were mountable onto and dismountable from printing cylinders. In order to accomplish such mounting and dismounting operations, the printing cylinders were modified at substantial cost to form an air-assisted construction capable of limited expansion of the printing sleeves.

The first patent to describe these new printing sleeves and complementary printing cylinders was U.S. Pat. No. 3,146,709. Compressed gas, generally compressed air, passing in a generally radial direction from holes located within the printing cylinders, was used to expand the sleeve to a limited extent for facilitating the mounting and dismounting operations. The outer wall of the cylinder has a slightly larger diameter than the inner wall of the sleeve, so that the sleeve will firmly frictionally fit onto the cylinder. The cylinder is hollow and has a cylindrical chamber which is used as a compressed air chamber. The printing cylinder typically comprises a cylindrical tube fitted with airtight endplates. A plurality of spaced-apart, radially-extending apertures are provided in the tube through which air from the chamber may pass for expanding the sleeve during mounting and dismounting operations. Air is introduced into the chamber through an air hose.

U.S. Pat. No. 4,144,812 and U.S. Pat. No. 4,144,813 provide non-cylindrical printing sleeves and associated air-assisted printing rolls designed in a tapered or stepped-transition configuration, the change in the sleeve or printing cylinder diameter from one end to the other being progressive, i.e., increasing or decreasing according to the direction one is moving along the printing sleeve or roll. The printing roll comprises an outer surface having one end of a diameter greater than the other longitudinal end. The printing sleeve has an inner surface designed to form an interference fit with the outer surface of the printing roll only at the designated working position, and not along the entire axial uniform cross-sectional extent of the tapered sleeve. In this case, both the tapered sleeves and the corresponding tapered cylinders must be replaced at great cost to the user.

Finally, in U.S. Pat. No. 4,089,265, a flexographic printing roll is provided comprising a rigid base tube having perforations in the form of a plurality of small apertures and a printing sleeve on the tube strained to grip the tube to retain the sleeve securely on the tube. There is no underlying printing cylinder in the conventional sense in this system.

Today, all of the prior art hollow cylinders must be modified to an air-assisted configuration in order to accommodate the mounting and dismounting operations of the expandable sleeves. Costs for such modifications range from about $60 to $200 per cylinder. Plants which employ such hollow cylinders typically have 500 to 5,000 on hand. Therefore, the cost for making such modifications can range upwards of a million dollars for larger user facilities. Furthermore, if the end user has cylinders of a solid rather than a hollow configuration, they cannot be modified to an air-assisted structure. Instead, hollow replacement cylinders must be purchased at a cost of about $1,000 per cylinder.

Complete coverage of the external air holes in the air-assisted cylinder by the sleeve is required in normal operations in all of the above-described prior art systems. Such coverage is required in order to generate an air barrier between the printing sleeve and the printing cylinder for performing the subject mounting and dismounting operations. Therefore, full-length expandable sleeves are used in all the prior art printing sleeve systems in order to maintain the requisite air barrier effect.

Therefore, a need exists for a device and a method of mounting a expandable sleeve onto non-air-assisted printing cylinders, as well as on presently existing air-assisted printing cylinders, which eliminates the prior art requirement for high cost modification of the hollow cylinders to convert them into an air-assisted configuration, and which permits the mounting and dismounting operations to be effectively conducted without the expandable sleeve completely covering the cylinder outer surface during such operations.

SUMMARY OF THE INVENTION

This invention relates to mounting and dismounting devices and methods which overcome the above-described problems associated with prior art internally air-assisted cylinders. The subject devices and methods can be employed for mounting and dismounting expandable sleeves onto and from cylinders which are not of the air-assisted type, such as the less expensive solid cylinders and the like, thereby avoiding the expenses involved in modifying the cylinders. In another aspect of this invention, the expandable sleeves employed in conjunction with the external mounting device of this invention can have a longitudinal dimension which is less than the longitudinal dimension of the cylinder. Clearly, prior art air-assisted cylinders cannot affect mounting and dismounting operations unless the sleeve has a longitudinal dimension equal to the longitudinal dimension of the cylinder. Thus, by employing the device of this invention, mounting of a plurality of sleeves onto, and dismounting a plurality of sleeves from, the underlying cylinder can be provided. In this way, a sleeve can be positioned at any point along the cylinder. For example, a three-section sleeve can be employed for printing indicia onto various substrates. For instance, a first sleeve section can print the name of the manufacturing company, a second sleeve section can print the type or nature of such product, and a third sleeve section can print the size of such product. If the product size were changed, the third sleeve section only could be dismounted from the cylinder and an alternate third sleeve section could be mounted in its place. Thus, a series of replacement sections, or a combination of permanent and replaceable sleeve sections can be employed on a given cylinder to maximize sleeve interchangability and cylinder use.

More specifically, the invention is directed to a device for axially and externally mounting an expandable sleeve onto, and dismounting the sleeve from, a cylinder. The subject device comprises an external fluid-transmission means for expanding the diameter of the expandable sleeve by introducing a fluid capable of expanding the sleeve between the inner surface of the sleeve and the outer surface of the cylinder. The requisite sleeve expansion is accomplished without transmitting fluid from within the cylinder during the mounting and dismounting operations. The sleeve is contractable by the removal of the fluid. More specifically, the external fluid-transmission means includes fluid entry means for introducing the fluid into the fluid-transmission means. Fluid entry means is in communication with a fluid transmission pathway which conveys the fluid from the fluid entry means to fluid-transmission interjection means. The fluid-transmission interjection means introduces the fluid between the cylinder and the sleeve for performing the sleeve expansion operation Typically, the fluid is pressurized for use in the mounting and dismounting operations, and preferably comprises a pressurized gas or liquid. The pressurized gas can comprise compressed air and the pressurized liquid can comprise a hydraulic fluid. The external fluid transmission means in the device preferably comprises a fluid transmission manifold including an interior portion which preferably engages an end of the sleeve. The manifold includes a fluid inlet means for transporting the fluid to within the interior portion of the manifold for introducing the expanding fluid between the sleeve and the cylinder. Preferably, the fluid is introduced between the sleeve and the cylinder in a direction between an axial direction and a radial direction, respectively, i.e., between about 0° and 90° with respect to the inner cylindrical surface of the sleeve.

The fluid transmission means of this invention can comprise a fluid transmission manifold which preferably engages the sleeve for introducing the fluid between the sleeve and the cylinder. The fluid transmission manifold preferably comprises fluid transmission collar means defining a central fluid transmission chamber sized to engage the end of the sleeve. Moreover, means can be provided within the collar for transporting the flow of the expanding fluid to the chamber for introduction between the sleeve and the cylinder. Preferably, the chamber means includes an internal recess sized to engage the end of the expanded sleeve and a plurality of apertures for introducing the expanding fluid between the sleeve and the cylinder.

The device can further include means for interlockingly connecting the fluid transmission means and the sleeve one to the other. The interlockingly connecting means can comprise means engaging the second end of the sleeve and which interlocking attaches to the fluid transmission means. This maintains the sleeve in position with respect to the fluid transmission means for facilitating the introduction of the expanding fluid during the mounting and dismounting operations.

The device of this invention preferably comprises fluid transmission means comprising a fluid transmission collar means defining a central fluid transmission chamber sized to engage the end of the expanded sleeve. It may also include interlocking attachment means comprising a second collar means which engages the second end of the sleeve. Moreover, the device may include a plurality of connector means which interlockingly attaches the fluid transmission collar to the second collar for maintaining the sleeve in position for facilitating the introduction of the fluid during the mounting and dismounting operations.

In another aspect of this invention, the expandable sleeves employed in conjunction with the external mounting device of this invention can have a longitudinal dimension which is less than the longitudinal dimension of the cylinder. Clearly, prior art air-assisted cylinders cannot affect mounting and dismounting operations unless the sleeve has a longitudinal dimension equal to the longitudinal dimension of the cylinder. Thus, by employing the device of this invention, mounting of a plurality of sleeves onto, and dismounting a plurality of sleeves from, the cylinder can be provided.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is an exploded, perspective view of the external mounting and dismounting device of the present invention, with a expandable sleeve in position for mounting about a printing cylinder.

FIG. 3 is an enlarged, fragmentary, sectional view of the expansion fluid inlet portion of FIG. 2, with the expandable sleeve in the contracted position.

FIG. 4 is an enlarged, fragmentary, sectional view of the expansion fluid inlet portion of FIG. 2, with the expandable sleeve in the expanded position.

DETAILED DESCRIPTION OF A PREFERRED EMBODIMENT

Figure 2:
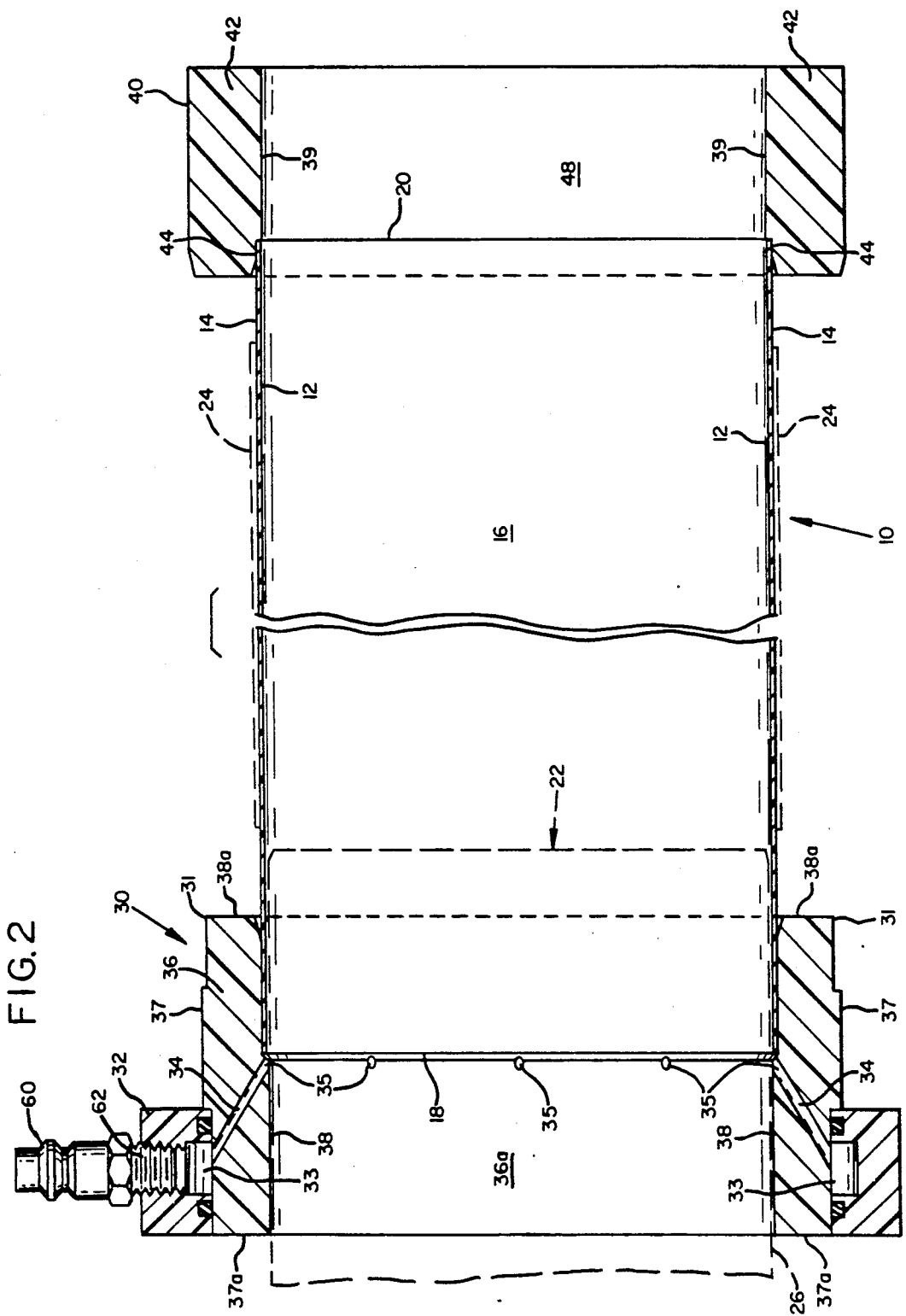
FIG. 2 is an enlarged, broken, sectional view of the device of FIG. 1, with the expandable sleeve and printing cylinder in mounting position therewith.

Referring now to FIGS. 1-4, a cylindrically-shaped expandable sleeve 10 is provided which comprises cylindrically-shaped inner and outer walls 12 and 14 which define a hollow inner chamber 16, and a pair of end sections 18 and 20. Sleeve 10 is depicted mounted onto a conventional solid, non-air-assisted printing cylinder 22.

Typically, sleeve 10 will serve as a support for the application of printing plates 24, preferably flexographic printing plates (see FIGS. 1 & 2 in phantom), which are generally made of a flexible polymeric material. Any suitable indicia for printing onto a printing medium may be set on these printing plates. Alternatively, outer wall 14 may itself be employed as the means for printing onto a printing medium. Various methods can be employed to engrave the outer wall 14. For example, one could employ chemical or photochemical engraving techniques to form the requisite means for printing the print indicia.

The expandable sleeve 10 and the printing cylinder 22 are cylindrical and have a constant diameter. The diameter of the outer wall section 26 of the printing cylinder is sized to receive expandable sleeve 10 having an inner wall surface 12 of substantially constant diameter. The magnitude of such inner wall 12 is slightly smaller than the diameter of the outer wall section 26 of the printing cylinder on which it will ultimately be mounted to promote an interference fit of the sleeve about the printing cylinder. The expandable sleeve is expanded using a pressurized gas to a cross-sectional diameter greater than the diameter of the printing cylinder employing the external sleeve mounting device of the present invention. The mounting and dismounting operations of the present invention can be readily accomplished using, for example, the laminate composite sleeve described in related, copending application U.S. Ser. No. 07/261,501, which is commonly assigned to the assignee of this application.

The invention of the commonly assigned copending application relates to printing sleeves which are readily mountable onto and dismountable from printing cylinders, and more particularly to printing sleeves which are expandably mountable and dismountable employing a pressurized gas.

First, the printing sleeve of the present invention comprises a printing sleeve body cylindrically-shaped having a constant cross-sectional diameter. This printing sleeve is therefore readily axially mountable on, and dismountable from, a complementary cylindrically-shaped printing cylinder having a constant cross-sectional diameter. In this way, conventional printing cylinders in use in various manufacturing facilities do not have to be replaced at great cost to the user.

The present invention provides for a printing sleeve structure having a printing sleeve body which is unitary and substantially airtight. Thus, this sleeve is strong, durable, and does not leak, all of which being problems which exist with respect to prior art wound printing sleeves. More specifically, the subject sleeves preferably are unitary structures because they are substantially seamless inner and outer cylindrically-shaped wall surfaces, and are airtight because they are constructed of materials which are high strength and non-permeable in nature. Strength and durability are properties clearly lacking in thin-walled (0.005") metallic sleeves. The preferred printing sleeves of this invention have a wall thickness of at least about 0.015".

Mounting of the printing sleeves of the present invention onto a conventional printing cylinder can be readily accomplished by expanding the diameter of these sleeves by the introduction of a relatively low fluid pressure between the inner wall surface of the sleeve and the outer wall surface of the printing cylinder. Preferably, in the printing sleeves of this invention, each of the inner and outer wall surfaces of the printing sleeve body has a substantially constant radial diameter. The printing sleeve is contractible by removing the expanding forces.

Typically the expanding forces are applied using a low pressure fluid, such as low pressure air and the like. The low pressure fluid is typically introduced at a pressure, at ambient temperature, of not more than about 100 psi, preferably not more than about 80 psi, and more preferably not more than about 50 psi, whereby the cross-sectional diameter of the printing sleeve is expanded for mounting of the printing sleeve onto the printing cylinder. The ability to use lower pressure gas is important since most production facilities do not have, for example, high pressure gas available for conducting the mounting and dismounting operations. Moreover, since this pressure is below 125 psi, there are no problems with government regulation as a pressure-rated container.

The printing sleeve exhibits certain preferred physical properties. These include a printing sleeve flexural modulus of at least about $6 \times 10^5$ lbs/in$^2$, and more preferably at least about $10 \times 10^5$ lbs/in$^2$. This provides excellent structural integrity but at the same time the low flexural modulus value permits the required level of expandability with the above described introduction of a relatively low pressure fluid. For purposes of this invention, flexural modulus was determined using ASTM D2412.

The printing sleeve of the present invention can also be fabricated with a wall thickness substantially greater than conventional metal printing sleeves. Preferably, this wall thickness is at least about 0.015", more preferably at least about 0.020", and most preferably at least about 0.040". In this way, printing plates having a much higher range of thicknesses can be employed. Although sleeves having a larger wall thickness can be fabricated by the teachings of this invention, a practical upper limit may be a wall thickness of about 0.120".

The printing sleeves of this invention is typically fabricated of a non-metallic material, preferably a polymeric material. The printing sleeves preferably comprises a reinforced non-permeable laminate structure including at least one reinforcing internal layer of a woven fabric of synthetic fibers or organic fibers, for particularly providing high tensile strength. A second internal layer may also be included which comprises at least one non-permeable internal layer, typically synthetic fibers. Preferably, the synthetic and organic fibers are of high strength, and the reinforced non-permeable internal layers comprises a non-woven fabric of synthetic fibers.

The outer wall surface of the printing sleeve exhibits a limited dimensional tolerance whereby printing plates can be mounted for complementary frictional engagement onto the outer wall surface of the printing sleeve so that the printing elements of differing colors located on the printing plate surface register within the exact specifications required for conducting process printing operations. Preferably, the printing sleeve exhibits a maximum difference in the trueness of its outer wall surface, when the sleeve is mounted on a true cylinder, is of more than about 0.005", preferably not more than about 0.025", and most preferably not more than about 0.001".

This invention also contemplates a method for axially mounting the previously described non-metallic, airtight, unitary, cylindrically-shaped printing sleeve of constant cross-section configuration, which includes substantially seamless inner and outer cylindrically-shaped wall surfaces of constant cross-sectional diameter, onto a complementary cylindrically-shaped, printing cylinder and for dismounting the printing sleeve therefrom. This is accomplished by expanding the printing sleeve to a cross-sectional diameter slightly greater than the diameter of the printing cylinder. This can be readily accomplished because of the above-described physical properties of the sleeve. The expanded printing sleeve is then axially moved to a position onto the printing cylinder. Then, the expanded printing sleeve is contracted to form a minimum interference fit between the printing cylinder and the printing sleeve, respectively, and thereby mounting the printing cylinder onto the printing sleeve. For dismounting purposes, the sleeve is expanded, as provided above, and then axially removed from its position about the printing cylinder. Preferably, the interference fit of the sleeve about the printing cylinder is from about 0.007" up to about 0.015", and more preferably from about 0.009" up to about 0.013". The printing sleeve was then machined to the requisite outer cylindrically-shaped wall section dimension, employing a lathe.

The dimensional tolerance of the printing sleeve was determined by using a dial indicator to measure the overall axial variation in the diameter of the entire surface of the outer wall section of the printing sleeve. For flexographic printing use, the limited dimensional tolerance of the printing sleeve should be not more than about 0.001. This type of printing is known as process printing. The printing sleeve produced herein met the criteria for process printing use. However, for the uses such as line printing, which includes bread bad printing and the like, a limited dimensional tolerance of not more than 0.025 is acceptable. Finally, in newsprint applications or the like where fine printing is not a critical parameter, limited dimensional tolerances of not more than about 0.005' can be employed.

In order to expand sleeve 10, an external mounting device, generally denoted 30 in FIG. 1, is provided. Mounting device 30 comprises mounting collar 31 and co-acting positioning collar 40 connected, as shown in FIG. 2, to respective sleeve ends 18 and 20. Mounting collar 31 comprises a collar body portion 36 defining a hollow central chamber 36a, and having a connector ring 32 joined thereabout, generally located toward the outer end wall 37a. Collar body portion 36 includes outer body wall 37 and inner body wall 38, as well as outer end wall 37a and inner end wall 38a. An annular air inlet passageway 33 extends within connector ring 32. Positioning collar 40 comprises a collar body 42 having an internal annular recess 44 at one end of a central chamber 48. A plurality of attachment eyelets 46 are secured to each of the outer surface of connector ring 32 and positioning collar 40, respectively. In a further embodiment, such as in the case when sleeve segments 10a-10c (in phantom) are employed, collar body portion 36 comprises a pair of collar body sections 36'. The sections 36' are held in place by bolts 32' which pass through connector ring 32 and attach to the sections 36'. When the second segment 10b is moved onto the cylinder 26 adjacent to first segment 10a, collar body portion 36 becomes locked in position between segments 10a and 10b. In order to remove collar body portion 36 from the locked position, bolts 32' are removed from ring 32. Ring 32 is then detached from collar body portion 36 thereby allowing sections 36' to separated one from the other and removed from their location about sleeve 10.

Valve 60 is employed to transfer the fluid from a remote source (not shown) to hose 70 (in phantom) which is attached to valve 60. Valve 60 includes a threaded end 62. Connector ring 32 is sized to engagingly receive threaded end 62. Thus, valve 60 is fastened to connector ring 32 via the interconnection of the threaded end 62. Valve 60 is in communication with annular inlet passageway 33 for transferring the expanding fluid from hose 70. Thus, if air is the fluid of choice, an expansion air transmission manifold is formed in which annular inlet passageway 33 is in communication with intermediate annular channel 34, which in turn is in communication with a plurality of discharge outlet holes 35. If sleeve 10 is capable of being expanded by a gas, the preferred gas is compressed air. In this case, hose 70 is connected to an air compressor which transfers compressed air through the hose to valve 60 and into collar 31. On the other hand, when the sleeve cannot readily be expanded by a gas, due to its size or to an extremely high coefficient of expansion, it may require the use of a liquid expansion medium, such as a hydraulic fluid. In this latter instance, hose 70 can be connected to a hydraulic pump which transfers a pressurized hydraulic fluid to valve 60 for liquid expansion of the sleeve. The particular hydraulic fluid employed depends to a great extent on the structural nature of the sleeve and cylinder materials of construction. It is also subject to the environment used. For example, if the environment is a printing ink, water may be acceptable fluid but certain hydrocarbons would not because of their reactivity with the ink.

Mounting collar 31 and collar 40 are held in position with respect to sleeve 10 by attachment means 50. In this case, attachment means 50 is in the form of expandable straps 52 having a pair of hooks 54 joined at its respective ends which are secured to eyelets 46 of connector ring 32 and positioning collar 40, respectively.

When the sleeve 10 is in position between collars 31 and 40, it can be expanded as depicted in FIGS. 3 and 4. First, air is delivered at the requisite expansion pressure through air hose 70 and into air valve 60. The air then passes as indicated by the directional arrows through the continuous expansion air manifold defined by passageway 33, channel 34 and discharge outlet holes 35 and exit collars 31 at both open ends, i.e., the openings defined by outer and inner end walls 37a and 38a. To facilitate expansion of sleeve 10, it is first moved into sealing engagement with cylinder 22. This is accomplished by introducing cylinder 22 into hollow central chamber 36a and moving it toward sleeve 10. When sleeve 10 and cylinder 22 are in sealing engagement, the air exiting discharge outlet holes 35 and flowing out of the opening defined by outer wall 37a is interrupted, and is directed toward the opening in inner wall 38a. The air exiting discharge holes 35 is thereby directed so that it flows within hollow inner chamber 16 (see FIG. 3), and forms an air bearing between inner sleeve wall 12 and outer cylinder surface 26. At this point, sleeve 10 is expanded so that wall 14 is in communication with annular recess 39 (see FIG. 4). The expanded sleeve can now be readily axially moved on the externally-created air bearing to a position concentrically about a printing cylinder 22, which has not been modified to include internal air-assisted flow means for use in expanding the sleeve.

Therefore, the expanded sleeve 10 is contracted by discontinuing the expanding air flow. An interference fit is formed between the printing cylinder and the sleeve, respectively, so that the sleeve is frictionally mounted in a predetermined position on the printing cylinder. For dismounting purposes, the sleeve is expanded, as provided above, and then axially removed from its position about the printing cylinder.

In the embodiment shown in FIG. 1, sleeve 10 is fabricated to fit over the outer surface of the printing cylinder 22. However, the dotted line on sleeve 10 indicates sleeve sections 10a-10c which together fit over the entire outer surface of the printing cylinder 22. The primary use for a multiple section sleeve is in the case where a portion of the entire sleeve requires change. Thus, for instance, if a printing operation required only the plates in section 10a to be changed on a regular basis, then that section only could be removed and replaced using the external mounting device of the present invention. Sections 10b and 10c could remain in place on the printing cylinder without change during use. On the other hand, sections 10b and 10c could also be replaceable. This expedites the sleeve changing process and requires substantially less storage space for sleeves not in use. In some cases, a section of the sleeve can even be permanently affixed to the cylinder.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a first collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said first collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid from within said cylinder during said mounting and dismounting operations.

2. The device of claim 1, wherein said fluid is one of a gas or a liquid.

3. The device of claim 1, wherein said fluid is compressed air.

4. The device of claim 1, wherein said fluid is a hydraulic fluid.

5. The device of claim 1, wherein said external fluid-transmission means includes at least one fluid entry passageway for introducing said fluid into at least one fluid transmission channel which conveys said fluid from said fluid entry passageway to a fluid-transmission interjection means, said fluid-transmission interjection means introducing said fluid between said cylinder sand said sleeve for expanding said sleeve.

6. The device of claim 5, wherein said cylinder has an axial and radial direction, and said fluid is introduced through said fluid transmission interjection means between said sleeve and said cylinder in a direction between said axial direction and said radial direction.

7. The device of claim 1, wherein said external fluid-transmission means includes a plurality of fluid entry passageways for introducing said fluid into a plurality of fluid transmission channels which convey said fluid from said fluid entry passageways to a fluid-transmission interjection means, said fluid-transmission interjection means introducing a fluid between said cylinder and said sleeve for expanding said sleeve.

8. The device of claim 7, wherein a fluid interjection means includes a plurality of discharge holes for introducing said fluid between said sleeve and said cylinder.

9. The device of claim 1, which further includes means for connecting said fluid transmission means and said sleeve one to the other.

10. The device of claim 9, wherein said means for connecting includes means engaging the second end of a sleeve, a means engaging the second end being attached to said first collar for maintaining said sleeve in position with respect to said fluid transmission means for facilitating the introduction of said fluid during said mounting and dismounting operations.

11. The device of claim 10, wherein said connecting means comprises a second collar which engages the second end of said sleeve and a plurality of connector means which attach said first collar to said second collar for maintaining said sleeve in position for facilitating the introduction of said fluid during said mounting and dismounting operations.

12. The device of claim 1, wherein said cylinder is a non-air-assisted cylinder.

13. The device of claim 1, wherein said fluid is introduced at a minimum fluid pressure of about 50 psi.

14. The device of claim 1, wherein said sleeve has a stiffness factor of at least about $7.26 \times 10^5$ inch-pounds.

15. The device of claim 1, wherein said sleeve has a flexural modulus of at least about $6 \times 10^5$ lbs. per in$^2$.

16. The device of claim 1, wherein said sleeve comprises a reinforced non-permeable laminate structure having a constant cross-sectional diameter.

17. The device of claim 1, wherein said sleeve has a maximum interference fit of 0.015 inch.

18. The device of claim 1, wherein said sleeve has a dimensional tolerance of up to about 0.005 inch.

19. The device of claim 1, wherein said sleeve is a printing sleeve.

20. The device of claim 19, wherein said sleeve exhibits a limited dimensional tolerance whereby printing plates mount for complementary frictional engagement onto the outer wall surface of the sleeve so that printing elements located on the surface of the printing plates register within specifications required for conducting printing operations.

21. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said firs and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid from within said cylinder during said mounting and dismounting operations, wherein said fluid is introduced at a minimum fluid pressure of about 50 psi.

22. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means, and between said sleeve and said cylinder, such that the diameter of said expandable sleeve is expanded without transmitting a fluid from within said cylinder during said mounting and dismounting operations, wherein said sleeve has a flexural modulus of at least about $6 \times 10$ pounds per square inch.

23. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid from within said cylinder during said mounting and dismounting operations, wherein said sleeve has a stiffness factor for at least about $7.26 \times 10$ inch-pounds.

24. A device for axially, externally mounting a rigid, expandable sleeve onto, and dismounting a rigid, expandable sleeve form, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid form within said cylinder during said mounting and dismounting operations, wherein said sleeve is of reinforced non-permeable laminate structure and has a constant cross sectional diameter.

25. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid from within said cylinder during said mounting and dismounting operations, wherein said sleeve has a maximum interference fit of 0.015 inch about said cylinder.

26. A device for axially, externally mounting a rigid, expandable sleeve onto, and dismounting a rigid, expandable sleeve from, a cylinder, wherein the longitudinal dimension of said sleeve is equal to or less than the longitudinal dimension of said cylinder, said device comprising:

a collar having a first bore of a first diameter, a second bore having a diameter greater than said first diameter, a planar surface joining said first and second bores, and fluid interjection means located within said planar surface, within said first bore, or within both said planar surface and said first bore, such that said cylinder is received within said first and second bores when said collar is placed around said cylinder and said sleeve is received within said bore; and, external fluid transmission means for expanding the diameter of said expandable sleeve by introducing a fluid through said fluid interjection means and between said sleeve and said cylinder, such that the diameter of said expandable sleeve is expanded without transmitting a fluid from within said cylinder during said mounting and dismounting operations, wherein said sleeve exhibits a dimensional tolerance of up to about 0.005 inch.

* * * * *

UNITED STATES PATENT AND TRADEMARK OFFICE
CERTIFICATE OF CORRECTION

PATENT NO. : 5,046,231
DATED : September 10, 1991
INVENTOR(S) : William L. Thompson It is certified that error appears in the above-indentified patent and that said Letters Patent is hereby corrected as shown below:

| | |
|---|---|
| Column 6 | Lines 25-26, change "comprises" to --comprise--; |
| Column 6 | Line 34, change "comprises" to --comprise--; |
| Column 6 | Line 47, change "0.025" to --0.0025--; |
| Column 7 | Line 16, change "the" to --other--; |
| Column 7 | Line 17, change "bad" to --bag--; |
| Column 7 | Line 19, change "0.025" to --0.0025--; |
| Column 7 | Line 22, change "0.005'" to --0.005"--; |
| Column 9 | Line 53, change "sand" to --and--; |
| Column 10 | Line 1, change "a" to --said--; |
| Column 10 | Line 9, change first "a" to --said--; |
| Column 10 | Line 53, change "firs" to --first--; |

UNITED STATES PATENT AND TRADEMARK OFFICE
CERTIFICATE OF CORRECTION

PATENT NO. : 5,046,231
DATED : September 10, 1991
INVENTOR(S) : William L. Thompson It is certified that error appears in the above-indentified patent and that said Letters Patent is hereby corrected as shown below:

Column 11      Line 51, change "for" to --of--;

Column 11      Line 55, change "form" to --from--;

Column 12      Line 9, change "form" to --from--.

Signed and Sealed this

Nineteenth Day of April, 1994

Attest:

BRUCE LEHMAN

*Attesting Officer*      *Commissioner of Patents and Trademarks*